Oct. 17, 1950  N. Q. LAWRENCE ET AL  2,526,144
VIEW FINDER FOR TELEVISION CAMERAS

Filed Sept. 14, 1948  2 Sheets-Sheet 1

*Inventors*
NATHANIEL QUENTIN LAWRENCE
LESLIE WALTER GERMANY
By CYRUS HERBERT BABBS Blair, Curtis + Hayward
*Attorneys*

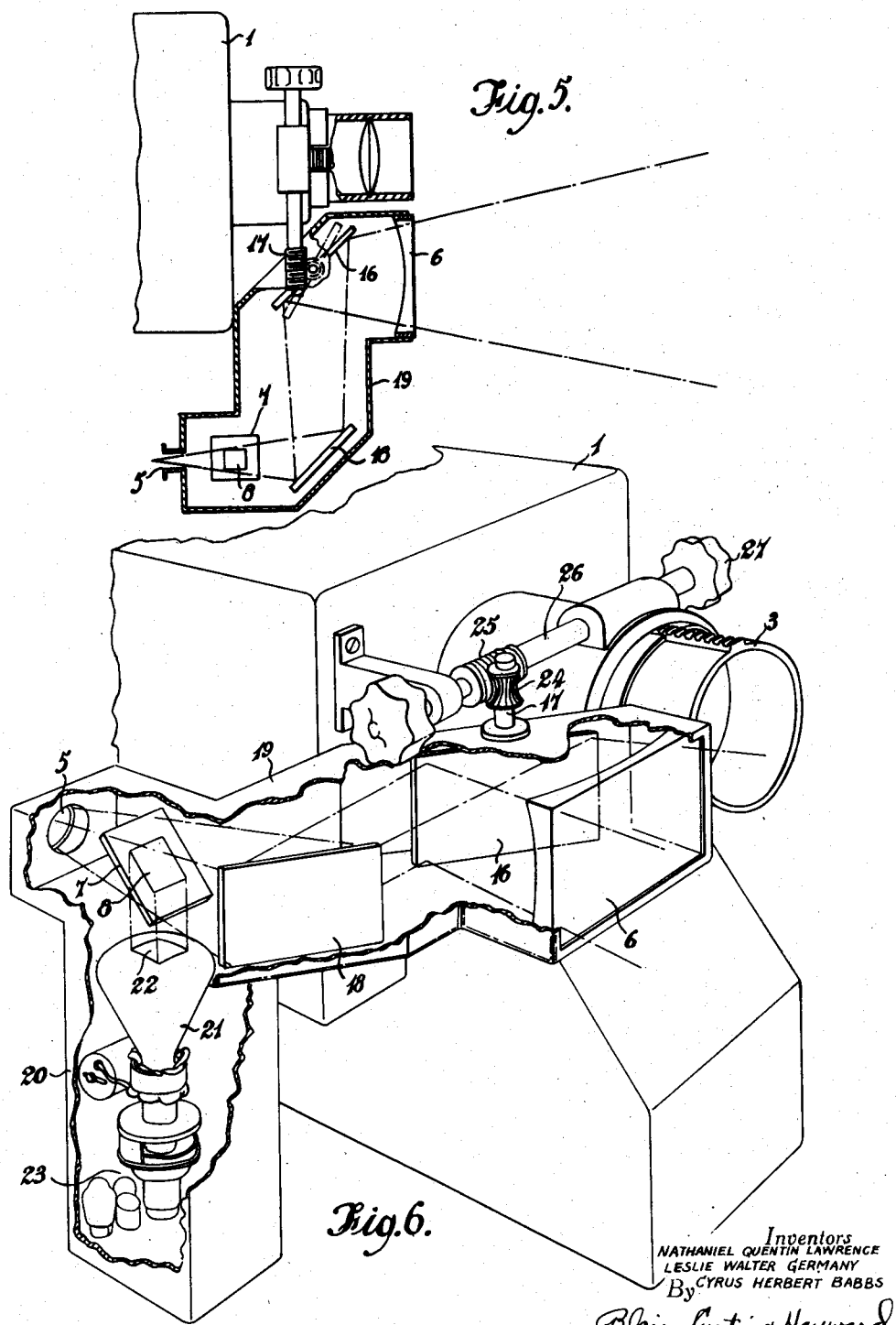

Patented Oct. 17, 1950

2,526,144

UNITED STATES PATENT OFFICE 2,526,144

VIEW FINDER FOR TELEVISION CAMERAS

Nathaniel Quentin Lawrence, Leslie Walter Germany, and Cyrus Herbert Babbs, Cambridge, England, assignors to Pye Limited, Cambridge, England, a British company Application September 14, 1948, Serial No. 49,224
In Great Britain July 4, 1947

7 Claims. (Cl. 178—6.8)

The present invention relates to a view finder for television cameras and more particularly to improvements in the view finder described in copending application Serial No. 792,051.

That specification describes a combined optical and electronic view finder in which the operator, on looking through the eyepiece, sees reflected in an inclined mirror the image of the screen of the monitor cathode ray tube on which is presented the picture originating in the camera, and extending around the edge of this mirror is a clear glass screen through which he can see the scene surrounding the object being televised. Due to the fact that the view finder must be displaced either horizontally or vertically from the axis of the camera lens, the separation being dictated by the size of the camera box, a parallax error is introduced when the camera is close to the object being televised which gives rise to the area surrounding the reflected image being displaced out of the correct framing as seen by the camera lens.

To overcome this difficulty, according to the present invention, the view finder is mounted so that it can be inclined inwardly so that it is framed centrally on the object being televised. According to a feature of the invention, means actuated by the operation of the camera focus control are used to deflect the field of view of the view finder. In this way the view finder is adjusted in sympathy with the operation of the focus control.

In one embodiment, the field directly seen through the view finder is changed by a mirror disposed behind the view finder aperture and rotatable about a vertical axis. The light reflected thereby is in turn reflected by a second mirror and thence through the plate with the silvered centre by which the electronic image is reflected to the eyepiece. The aperture of the view finder may be provided with a planoconcave lens to give the correct acceptance angle.

In order that the invention may be more clearly understood, reference will now be made to the accompanying drawings, in which Fig. 1 shows a plan view indicating the field covered by the camera and the view-finder constructed as described in the above-mentioned copending application.

Fig. 5 shows a plan view of a preferred embodiment of the optical part of the view-finder according to the present invention.

Fig. 6 shows a perspective view, partly cut away of a view-finder according to the invention fitted to a television camera.

Figure 1:
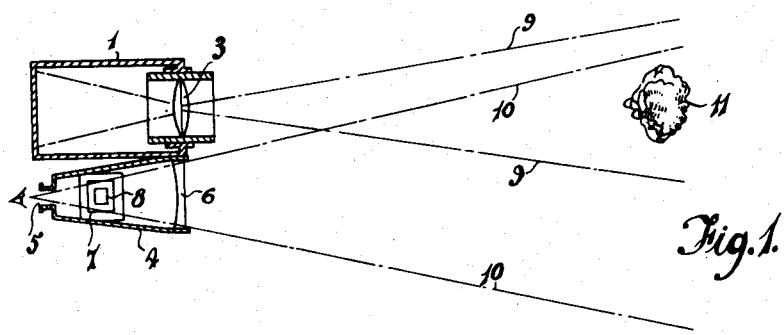

Referring to Fig. 1 of the drawings, 1 represents the television camera fitted with the lens 3, and by the side of which is fixedly mounted the view-finder 4 having the eyepiece 5 and the acceptance lens 6. The electronic part of the view-finder, which is constructed as described in the aforementioned copending application, is not completely shown in this figure in which only the transparent plate 7 having the central mirror 8 by which the cathode ray image is reflected into the eye-piece are shown in the figure.

Due to the fact that the axis of the view-finder must be displaced from the axis of the camera lens, the fields of view of the camera and view-finder, as indicated by the continuous lines 9 and the chain-dotted lines 10, respectively, are not co-incident. This introduces a parallax error when the camera is close to the object 11 being televised which gives rise to the image seen directly through the transparent area of the plate 7 surrounding the electronic image reflected in the mirror 8 being displaced out of the correct framing with reference to the camera lens. This is illustrated in Fig. 2 which shows the disposition of the two images of a close object as seen through the view-finder of the system shown in Fig. 1.

Figure 2:
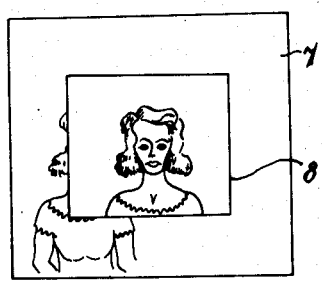
Fig. 2 shows the view seen through the view-finder, with the arrangement according to Fig. 1, when the object is close to the camera.
Figure 3:
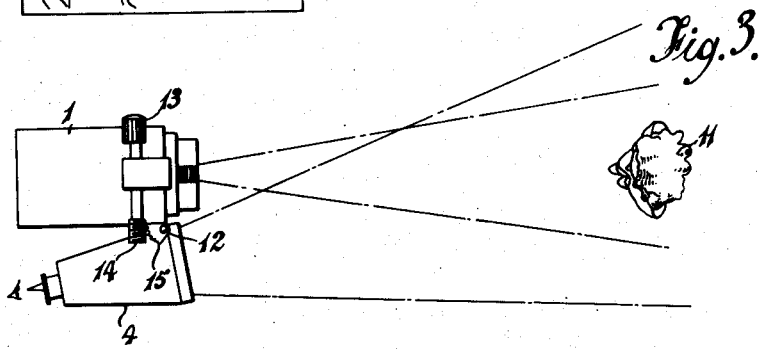
Fig. 3 shows a plan view similar to Fig. 1 with the view-finder mounting modified according to this invention.
Figure 4:
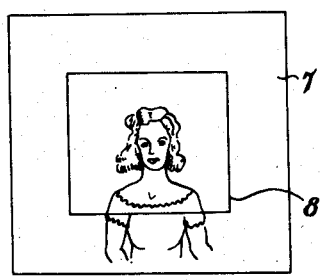
Fig. 4 shows the view seen through the view-finder with the arrangement according to Fig. 3.

To overcome this difficulty, according to the invention, the view-finder 4 is, as shown in Fig. 2, pivotally mounted about a vertical axis 12 so that it can be orientated inwardly and framed centrally on the object 11 being televised. The control means 13 for effecting the camera focussing is also coupled to the view-finder, for example, through the worm 14 and toothed segment 15, so that the field of view of the view-finder is deflected or orientated in sympathy with the operation of the focus control. With this arrangement, the image reflected by the mirror 8 is correctly positioned with respect to the image directly viewed through the surrounding transparent portion of the plate 7, as is illustrated in Fig. 4.

Figs. 5 and 6 show an embodiment of the invention, Fig. 5 showing a plan view of the optical part of the view-finder and Fig. 6 a perspective view of the complete view-finder with the casing thereof partly cut away.

In this embodiment the field of view directly seen through the plano-concave lens 6 fitted in the acceptance aperture of the view-finder is changed by a mirror 16 disposed behind the lens 6 and carried by a rotatable vertical spindle 17. The light reflected by the mirror 16 is, in turn, reflected by a second mirror 18 and through the transparent surround of the plate 7 with the silvered centre 8 into the eye-piece 5. The lens and mirrors so far described are arranged in a suitably shaped casing 19 secured to the camera 1, and projecting beneath the casing 19, directly below the plate 7, is a compartment 20 in which is located a cathode ray tube 21 upon the screen of which the electronic image 22 is formed, and reflected into the eye-piece through the silvered portion 8 of the plate 7. The compartment 20 also contains the amplifier 23 and other equipment associated with the cathode ray tube 21.

The spindle 17 is coupled through the pinion 24 and worm 25 with the spindle 26 of the control means 27 for adjusting the focus of the television camera.

With the arrangement described, the field of view seen directly through the optical view-finder is deflected or orientated in accordance with the adjustment of the camera focus control so that the optical view-finder is framed centrally on the object being televised and the two images seen through the eye-piece 5 are kept in register, as shown in Fig. 4.

Whilst a particular embodiment has been described, it will be understood that various modifications may be made without departing from the scope of the invention as defined by the appended claims.

We claim:

1. View finder for television cameras comprising a monitor cathode ray tube for reproducing the picture originating in the television camera, an optical view finder covering a field of view greater than the field of view to be televised, means for superimposing the picture reproduced on the monitor cathode ray tube upon the picture reproduced by the optical view finder, whereby the operator sees the picture reproduced by the monitor cathode ray tube surrounded by the scene immediately surrounding the field of view being televised, and means for deflecting the field of view of the optical view finder relative to the field of view of the camera.

2. View finder for television cameras having focus control means, comprising an eyepiece, a monitor cathode ray tube for reproducing the picture originating in the television camera, means for transmitting the picture reproduced by the monitor cathode ray tube into the eyepiece, an optical view finder system associated with said eyepiece and covering a field of view greater than that reproduced by the monitor cathode ray tube, means for transmitting to the eyepiece a picture corresponding to the field of view surrounding that reproduced by the monitor cathode ray tube, and means for orientating the field of view of the optical view finder relative to the field of view of the camera in dependence upon the adjustment of the camera focus control.

3. View finder for television cameras having focus control means, comprising an eyepiece, a monitor cathode ray tube for reproducing the picture originating in the television camera, an optical view finder system associated with said eyepiece and covering a field of view greater than that reproduced by the monitor cathode ray tube, a mirror positioned in front of the eyepiece and reflecting thereinto the picture reproduced by the monitor cathode ray tube, said mirror being of the smallest size requisite for reflecting the whole of said picture into the eyepiece, and means for orientating the field of view of the optical view finder relative to the field of view of the camera in dependence upon the adjustment of the camera focus control.

4. In combination, a television camera movably mounted on a support and a view finder carried by said camera and movable therewith, said camera having control means for adjusting its focus, said view finder comprising an eye aperture and optical system covering a field of view greater than that covered by the television camera, a monitor cathode ray tube, means for reproducing on said monitor cathode ray tube a picture corresponding to the picture originating in the camera, a mirror interposed in the path of the light beam of the optical view finder and so disposed as to reflect the picture reproduced by the monitor cathode ray tube into the eye aperture, the said mirror being only of the size requisite for reflecting the whole of the picture reproduced by the monitor cathode ray tube into the eye aperture, a pivotal connection between the camera and the view finder, and means for orientating the axis of the view finder towards the axis of the camera in dependence upon the adjustment of the camera focus control means.

5. In combination a television camera movably mounted on a support and a view finder carried by said camera and movable therewith, said camera having control means for adjusting its focus, said view finder comprising an eyepiece and optical system covering a field of view greater than that covered by the television camera, a monitor cathode ray tube, means for reproducing on said monitor cathode ray tube a picture corresponding to the picture originating in the camera, a transparent plate disposed in the path of the light beams of the optical view finder, a mirror of smaller dimensions than said plate and disposed adjacent the centre thereof, said mirror being arranged at such angles with respect to the monitor cathode ray tube and the eyepiece of the view finder that the picture reproduced on the monitor cathode ray tube is reflected by the mirror into the eyepiece, a second mirror interposed in the path of the light beam of the optical view finder for reflecting the light beam before it is directed to the eyepiece, and means for swinging said second mirror about an axis in dependence upon the adjustment of the camera focus control.

6. A view finder for television cameras having focus control means, comprising an eyepiece and optical system covering a field of view greater than that to be televised, a monitor cathode ray tube for reproducing a picture corresponding to the picture originating in the camera, a transparent plate disposed in the path of the light beams of the optical view finder, a mirror surface of smaller dimensions than the transparent plate and formed on the transparent plate, said plate being arranged at such angles with respect to the monitor cathode ray tube and the eyepiece of the view finder that the picture reproduced on the monitor cathode ray tube is reflected by the mirror into the eyepiece, the dimensions of said mirror surface being substantially such that the picture reflected thereby as seen from the eyepiece occupies substantially the entire area thereof, a second mirror interposed in the path of the light beam of the optical view finder for reflecting the light beam before it is directed to the eyepiece, and means for swinging said second mirror about an axis in dependence upon the adjustment of the camera focus control.

7. A view finder for television cameras comprising an eyepiece, an optical system constituting an optical view finder, a monitor cathode ray tube, and a mirror so interposed in the path of the light beam of the optical view finder as to intercept a part only of said beam, and so disposed as to reflect the picture reproduced by the monitor cathode ray tube into the eyepiece, a second mirror interposed in the path of the light beam of the optical view finder for reflecting the light beam before it is directed to the eyepiece, and means for swinging said second mirror about an axis.

NATHANIEL QUENTIN LAWRENCE.
LESLIE WALTER GERMANY.
CYRUS HERBERT BABBS.

REFERENCES CITED

The following references are of record in the file of this patent:

UNITED STATES PATENTS

| Number | Name | Date |
| --- | --- | --- |
| 2,403,628 | Beers | July 9, 1946 |
| 2,420,198 | Rosenthal | May 6, 1947 |

FOREIGN PATENTS

| Number | Country | Date |
| --- | --- | --- |
| 518,090 | Great Britain | Feb. 16, 1940 |